K. KNUTSON.
HATCH COVER.
APPLICATION FILED FEB. 11, 1919.

1,352,202.

Patented Sept. 7, 1920.

Inventor
Knut Knutson,
By Henry Atty.

UNITED STATES PATENT OFFICE.

KNUT KNUTSON, OF BERGEN, NORWAY.

HATCH-COVER.

1,352,202.   Specification of Letters Patent.   Patented Sept. 7, 1920.

Application filed February 11, 1919. Serial No. 276,378.

*To all whom it may concern:*

Be it known that I, KNUT KNUTSON, a subject of the King of Norway, residing at Bergen, Norway, have invented certain new and useful Improvements in Hatch-Covers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to hatches for use in ships, lighters and the like, as well as for use in industrial plants, and may be considered as a further development of my U. S. Patent No. 948733 on an improved double corrugated sheet iron, and my British Patent No. 26511 of 1910 on a multiple sheet iron. According to my invention I adapt the principle known from the said patents to the construction of hatch covers of corrugated plates of heavy sheet iron.

Figure 1:
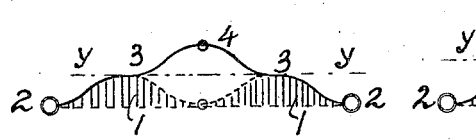
Figure 2:
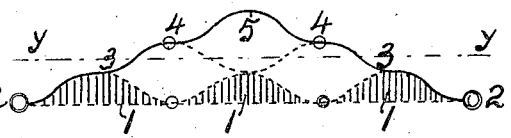
Figure 3:
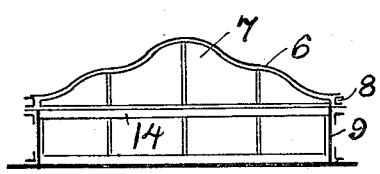
Figure 4:
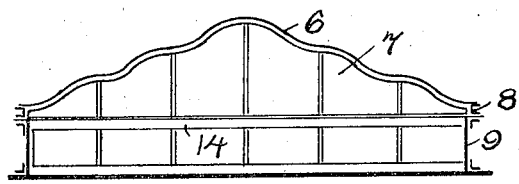
Figure 5:
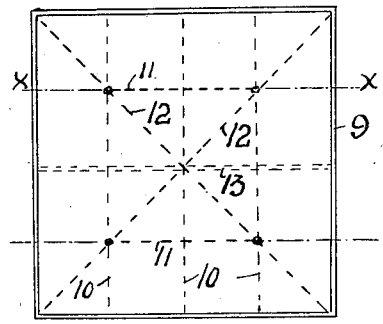
Figure 6:
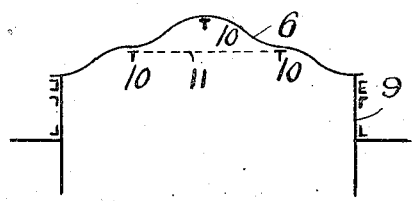
Figure 8:
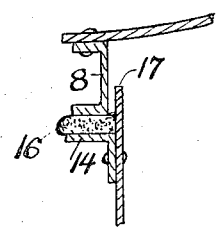
Figure 7:
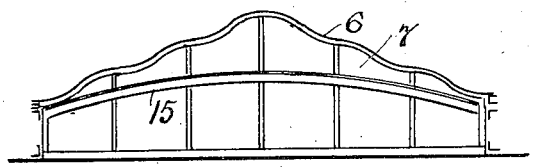

In the following the invention shall be fully explained, reference being had to the accompanying drawings in which Figures 1 and 2 are diagrams illustrating the transformation of the corrugations or waves of an ordinary corrugated sheet iron into double and triple corrugations respectively, and Figs. 3 and 4 are diagrammatic cross sectional views of hatches with double corrugated sheet iron covers and triple sheet iron covers respectively. Fig. 5 is a plan view of a hatch coaming. Fig. 6 a cross sectional diagram on line $x$—$x$ Fig. 5, and Fig. 7 is a cross sectional view of a modified form of a hatch cover and coaming. Fig. 8 illustrates a detail.

The diagram Fig. 1 illustrates the transformation of the corrugations or waves 1, 1 of an ordinary corrugated sheet (these waves being shaded in the diagram), into a double corrugation or wave forming a wave line 2, 3, 4, 3, 2, and in the diagram Fig. 2 is illustrated a corresponding transformation of three ordinary corrugations or waves 1, 1, 1, into a triple corrugation or wave line 2, 3, 4, 5, 4, 3, 2; the lines $y$—$y$ representing the axis of gravity of the profiles. It will be seen that compared with the ordinary waves 1, 1 these double and triple cross sections have, in accordance with the above mentioned patents, without any increase of length, cross sectional area or weight, a height two times, and three times, respectively, of the waves 1 of the original corrugated form.

These double and triple section forms as explained in the above mentioned patents have a considerably larger bearing strength or moment of resistance than the corrugations 1, 1, of an ordinary corrugated sheet iron. An exact calculation shows that the transformation of two original corrugations into one "double" corrugation or wave does not increase the weight but increases the bearing strength about 55%, and that the transformation of three original corrugations into a "triple" corrugation wave increases the bearing strength about 110%.

Compared with the corrugation forms known from the patents before mentioned the present form in order to be adapted for its novel use has been considerably modified, the corrugations not having a greater height than width, but on the contrary a considerably greater width than height, whereby a flattened rooflike or vaultlike form of the wave is obtained, retaining, however, at the same time the longitudinal stiffness of the corrugations. While the old double and multiple corrugated sheet iron had its principal strength in the longitudinal direction the present modified form has as well a considerable strength in planes at right angles to the corrugations.

Hatches of this corrugation or wave type may be made of one piece of rolled plate or if the width of the plate is insufficient hereto, be composed of two or more interconnected plates.

In a corresponding way hatches also may be made of plates having "quadruple," "quintal" and "sextal" corrugations or waves of the same cross sectional area and weight as their respective original forms, from which they may always be considered to be raised.

In Fig. 3 is shown a hatch cover 6, made of a double corrugated plate, said plate forming a free carrying beam resting at the ends on end walls 7 without any intermediate support and having along its longitudinal edges a horizontal frame of U-iron 8, in direct contact with the upper face of the coaming 9.

Fig. 4 illustrates a similar hatch cover differing only from that shown in Fig. 3 therein that the cover 6 is "triply" corrugated.

In hatches of large dimensions it will be necessary to use beams 10 (see Figs. 5 and 6) supporting the curve of transition between the individual waves, and transversal stays 11 (indicated with broken lines in Figs. 5 and 6) as well as diagonal stays 12. These stays as well as a transverse support or wall 13 in the middle part of the hatch cover 9 serve as supports or stays for the hatch cover, when this is swung up on hinges (not shown) such hinges being preferably arranged along its side for instance one in the middle and one at each end. Owing to their light construction the hatch covers may without difficulty be swung on hinges.

The hatch cover end walls 7 are supported by angle iron 14 of the coaming 9 which may be arranged horizontal as shown in Figs. 4 to 6, or the end walls may be curved as shown by 15 on Fig. 7. In this latter case the lower edges of the end walls of the hatch covers are curved correspondingly whereby the weight of the hatch cover is reduced.

As shown in Fig. 8 the space between the edge frame of the hatch cover and the coaming may suitably be made so wide as to give room for a packing 16 of felt, sail cloth, wooden laths or any other material fit for making a watertight joint, the edge 17 of the coaming projecting above the angle iron frame 14 serving as support for the hatch cover.

All parts of the individual corrugations of the hatch covers slope toward the sides of the hatches, so that water will not remain on them and the use of tarpaulin may therefore be dispensed with.

The principal result of my invention is providing a type of hatch covers having a very great bearing strength or moment of resistance compared with its cross sectional area, thereby enabling using lighter hatches than heretofore.

Claims.

1. A hatch cover comprising a hatch cover frame for connection with a hatch coaming and a corrugated plate secured to said cover frame and extending from side to side of said frame arch-shaped in section and the corrugations arranged transversely of the arch.

2. A hatch cover comprising a hatch cover frame for connection with a hatch coaming, and a longitudinally corrugated transversely arched single thickness plate secured to said cover frame and forming its top and having a central corrugation at its crown.

3. A hatch cover comprising a hatch cover frame for connection with a hatch coaming and a continuous, transversely corrugated arched top plate secured to said cover frame and forming its top, and having a middle corrugation at its crown and parallel side corrugations on the side portions of said arch.

4. A hatch cover comprising a hatch cover frame for connection with a hatch coaming, and an arch-shaped roof secured to said frame having a central corrugation at its crown and parallel lateral corrugations, the height of said roof being a multiple of the height of each corrugation and each corrugation being of less height than width.

5. A hatch cover comprising a hatch cover frame to be secured to a coaming, and an arched roof secured to said frame having a plurality of corrugations curved in cross-section and odd in number, there being a single corrugation at the middle, the height of the cover being a multiple of the height of each corrugation and the height of each corrugation being less than its width, all of said corrugations combining to act as a single beam.

6. A hatch cover comprising a hatch cover frame having end plates curved on their lower edges, said cover adapted to fit a complementary shaped coaming, an arched corrugated sheet metal roof secured to said frame the height of the arch being a multiple of the height of each corrugation and the general curvature of the arch being of less radius than the lower edges of the end plates.

7. A hatch cover comprising a hatch cover frame to be secured to a coaming, and an arched roof secured to said frame developed from a plurality of superposed contacting horizontal rows of curved corrugations presenting quincuncial arrangement, there being a central corrugation at the crown.

8. A hatch cover comprising a hatch cover frame to be secured to a coaming and a continuous corrugated arched sheet metal roof secured to said frame, the corrugations being curved in cross-section, and members on said frame supporting the roof intermediate its sides at the transition curves connecting adjacent corrugations.

In testimony that I claim the foregoing as my invention, I have signed my name in presence of two subscribing witnesses.

KNUT KNUTSON.

Witnesses:
W. HAKSEN,
JOHN KUAMME.